United States Patent [19]

Tazawa et al.

[11] Patent Number: 4,795,779
[45] Date of Patent: Jan. 3, 1989

[54] PROCESS FOR PRODUCING INORGANIC COMPOUND-CONTAINING UREA RESIN

[75] Inventors: Shunsuke Tazawa, Tokyo; Katsuhiko Kurihara, Yokohama; Kenji Takeuchi, Nagoya; Mitsuaki Abe, Hachinohe, all of Japan

[73] Assignee: Nitto Chemical Industry Co., Ltd., Tokyo, Japan

[21] Appl. No.: 55,261

[22] Filed: May 29, 1987

[30] Foreign Application Priority Data

May 30, 1986 [JP] Japan .................... 61-123424
Jun. 11, 1986 [JP] Japan .................... 61-133892
Jun. 30, 1986 [JP] Japan .................... 61-151711

[51] Int. Cl.$^4$ .................... C08L 61/22; C08K 3/20
[52] U.S. Cl. .................... 524/598; 524/417; 524/423; 528/259
[58] Field of Search .................... 528/259; 524/598, 843, 524/417, 423

[56] References Cited

U.S. PATENT DOCUMENTS 4,284,759 8/1981 Henbest et al. .................... 528/261

FOREIGN PATENT DOCUMENTS

| 46-28087 | 8/1971 | Japan . |
| 46-2953 | 10/1971 | Japan . |
| 47-36879 | 9/1972 | Japan . |
| 49-2030 | 1/1974 | Japan . |
| 49-2350 | 1/1974 | Japan . |
| 50-82195 | 7/1975 | Japan . |
| 54-135893 | 10/1979 | Japan . |
| 57-133146 | 8/1982 | Japan . |

Primary Examiner—Theodore E. Pertilla
Attorney, Agent, or Firm—Cushman, Darby & Cushman

[57] ABSTRACT

A process for producing an inorganic compound-containing urea resin, which comprises adding an acidic gelling agent to an aqueous urea-formaldehyde precondensate solution to prepare a urea resin-containing product, and either
(1) mixing the product with a reactant which reacts with the gelling agent to form inorganic particles substantially insoluble in water, or
(2) separating the urea resin from the product, mixing the resin-freed mother liquor with such a reactant as stated above, and mixing the resulting inorganic particles with the separated urea resin.

8 Claims, No Drawings

PROCESS FOR PRODUCING INORGANIC COMPOUND-CONTAINING UREA RESIN

BACKGROUND OF THE INVENTION

1. Field of the Invention

The present invention relates to a process for producing a urea resin and more particularly to a process for producing (1) a urea (hereinafter designated as U-formaldehyde (hereinafter designated as F) resin having a good dispersibility and particle size of 1 μm or less mixed with substantially water-insoluble inorganic particles having a wide particle size distribution or (2) a U-F resin with a low content of water-soluble ingredients which is mixed with particles of substantially water-insoluble inorganic compounds having a wide particle size distribution.

The inorganic compound-containing urea resin obtained according to the invention is useful as; a filler having high dispersibility for natural rubbers, synthetic rubbers, polyethylene, and other thermoplastic resins; filler for paper; carrier for herbicides, disinfectants, insecticides, and the like; slow-release nitrogenous fertilizer, paint pigment, heat insulator etc.

As fillers for paper, a variety of inorganic compounds have hitherto been used and there has been a recent tendency to use occasionally organic compounds such as urea resins, but this replacement has not fully been achieved. The inorganic compound-containing urea resin of the present invention is expected to be used as a good filler for paper in that the resin combines advantages of organic and inorganic compounds, contains less watersoluble matter, and can be produced at low costs.

2. Description of the Prior Art

A number of processes have been proposed for producing U-F resin particles. Examples of the processes proposed are as follows:

(1) A process comprising treating in aqueous U-F precondensate solution with an acid substance to form a crosslinked gel, followed by size reduction, drying, and crushing the gel (Japanese patent publication Nos. 28087/71, 36879/72, and 2030/74 and Japanese patent application Laid-Open No. 2953/71).

(2) A process comprising mixing an amino resin precondensate solution with a condensation catalyst in a tube mixer for a shorter residence than the time for gelling the solution, and gelling the mixture in an extruder or a screw mixer, followed by post-curing of the solid gel for a period of at least 30 minutes (Japanese patent publication No. 2350/74).

(3) A process comprising preparing a urea resin having a specific water-solubility and a specific viscosity, and adding an inorganic acid to the resin within a prescribed range of the resin-to-water ratio (Japanese patent application Laid-Open No. 82195/75).

(4) A process comprising mixing a gelling agent with an aqueous solution of a U-F precondensate having a specific F/U molar ratio, the solution having a specific water/solid ratio, and solidifying the mixture continuously over a revolving endless belt, followed by coarse grinding, slurrying, neutralizing, and grinding to form granules (Japanese patent application Laid-Open No. 135893/79).

(5) A process comprising reacting a U-F precondensate in an aqueous acid catalyst solution, followed by neutralizing the resulting mixture and adding an inorganic filler, to yield a U-F resin filler (Japanese patent application Laid-Open No. 133146/82).

For producing particles of inorganic compounds such as silica, alumina, and silica-alumina, there have also been proposed a number of processes, which can be classified into wet processes and dry processes.

A typical example of the wet processes comprises decomposing an alkali silicate, alkali aluminate, or aluminum sulfate with an inorganic acid, followed by separation, drying, and calcining the decomposition product. A typical example of the dry processes comprises vaporizing purified silicon tetrachloride or anhydrous aluminum chloride, and hydrolyzing the vapor in an oxyhydrogen flame.

According to any of the prior art processes including those described above, a U-F resin and an inorganic compound such as silica are produced separately in the form of particles. Hence, the preparation of mixtures of these products is inferior in production efficiency, admitting of improvement in this respect.

When an aqueous solution of a U-F precondensate is gelled simply by adding a gelling agent, the resulting U-F resin has generally particle sizes ranging from 1 μm to scores of μms though some of the particles have sizes less than 1 μm. Although these particles can be ground to sizes of 0.1 to 1 μm, this requires many hours, being inferior in effectiveness. This method has an additional drawback in that, in order to provide a wide particle size distribution, it is necessary to adjust the particle sizes by mixing particle groups different in particle size distribution.

There are similar drawbacks in the preparation of particles of inorganic compounds (hereinafter sometimes referred to as inorganic particles) such as those of silica. For instance, while the size of silica particles produced by the wet process depends on various factors including the concentration and viscosity of the starting material, gelling conditions (such as the kind and amount of gelling agent, gelling temperature, agitation of reaction mixture, and ageing period of time), drying temperature, calcining temperature, etc., the sizes of silica particles produced under definite conditions are distributed in such a narrow range as from 0.01 to 0.05 μm, from 1 to 10 μm, or from 10 to 50 μm; hence, in order to provide silica particles having fine sizes and a wide particle size distribution, for example, from 0.01 to 1 μm, it is necessary to adjust the particle sizes by either mixing products different in particle size or grinding a product again.

Thus, the production of U-F resin particles and inorganic particles has required many operation steps and has been bothersome and time-consuming. Therefore, it is desired to ameliorate the production process.

On the other hand, U-F resin particles produced according to prior art processes contain much water-soluble matter, since the gelling agent used is water-soluble and even when the gelling agent remaining in the produced resin particles is neutralized with a common alkali, the salt formed thereby is generally water-soluble.

When such U-F resins are used as fillers for paper in paper making processes, water-soluble ingredients thereof are dissolved in working water and this may cause troubles. Also when such U-F resins are used as fertilizers, water-soluble salts therefrom are liable to hinder the germination of seeds and the growth of plants. Therefore it is desirable that U-F resins for the present purposes contain minimized amounts of water-soluble matter.

In order to remove water-soluble matter from the produced resin, it is necessary to add the step of washing the resin with water. Liquid formed by the separation or water used for the washing in this step may be recycled for reuse but this raises the problem of the accumulation of water-soluble matter which will deteriorate the product quality.

According to a process, as described in Japanese patent application Laid-Open No. 133146/82, cited in 5) above, which comprises reacting a U-F precondensate in an aqueous acid catalyst solution, followed by treating the resulting mixture with an alkali such as aqueous sodium hydroxide or aqueous ammonia, a water-soluble salt such as sodium sulfate or ammonium sulfate is formed by acid-alkali neutralization reaction even when such a water-insoluble inorganic filler is added as talc, clay, white carbon, titanium dioxide, calcium carbonate, calcium silicate, or aluminum hydroxide. Hence, the step of washing the separated resin with water must be added in order to remove the water-soluble salt and facilities are necessary for the disposal of washing waste water and for the prevention of environmental pollution.

The problem will not be solved even by taking the method of reacting a U-F precondensate in an aqueous acid catalyst solution, separating the resulting resin and an added inorganic filler from the mother liquor, and then treating the resin and the filler with a common alkali. It is because the thus obtained solid consists of fine particles and hence has a water-holding capacity as high as about 40 to 80% when centrifuged in the ordinary manner, so that the acid contained in the mother liquor held by the particles forms a large amount of water-soluble salt when neutralized with the alkali.

SUMMARY OF THE INVENTION

Aiming at solving the above noted problems, the present inventors made intensive studies, and have accomplished the present invention.

The inventors have found that it is possible to produce effectively and more rationally a mixture of U-F resin particles with substantially water-insoluble inorganic particles having a wide particle size distribution by mixing (a) a urea resin-containing product (hereinafter referred to as product A) resulting from adding an acidic gelling agent to an aqueous U-F precondensate solution with (b) a reactant which reacts with the added gelling agent to form inorganic particles substantially insoluble in water or by mixing (a') an inorganic compound which is obtained by mixing said reactant with a separated mother liquor (hereinafter referred to as mother liquor A) obtained by removing the urea resin from said product A with (b') the removed urea resin.

That is, one object of the invention is to provide a process for obtaining U-F resin particles having properties mentioned above.

Another object of the invention is to provide a process for producing U-F resin particles which have a little water-extractable fraction and are useful, even in wet form, as a filler for paper in paper making processes, as a slow-release nitrogenous fertilizer, and for other applications, said process requiring no step of removing water-soluble matter from product A.

The invention includes two processes, which are summarized as follows: The first is a process for producing an inorganic compound-containing urea resin, which comprises adding an acidic gelling agent to an aqueous urea-formaldehyde precondensate solution to prepare a urea resin-containing product, and mixing the product with a reactant which reacts with the gelling agent to form inorganic particles substantially insoluble in water. The second is a process for producing an inorganic compound-containing urea resin, which comprises adding an acidic gelling agent to an aqueous urea-formaldehyde precondensate solution to prepare a urea resin-containing product, separating the urea resin from the product, mixing the resin-freed mother liquor with a reactant which reacts with the gelling agent to form inorganic particles substantially insoluble in water, and mixing the resulting inorganic particles with the separated urea resin.

The term "an inorganic compound-containing urea resin" in the present specification includes a mixture of at least one inorganic compound and a U-F resin and a U-F resin containing fine particles of at least one inorganic compound in the particles of said resin.

In the invention, the embodiment of gelling agent-reactant combination used can be classified into the following three:

Embodiment A: The combination of a gelling agent which is an acid substance with a reactant which is at least one compound selected from the group consisting of alkali silicates and alkali aluminates.

Embodiment B: The combination of a gelling agent which is an acidic silica sol or/and an acidic alumina sol with a reactant which is an alkaline substance.

Embodiment C: The combination of a gelling agent which is sulfuric acid or/and phosphoric acid with a reactant which reacts with the gelling agent to form inorganic particles substantially insoluble in water.

According to the embodiment (A) or (B), there can be obtained a U-F resin having a particle size of 1 $\mu$m or less, a good dispersibility and a wide particle size distribution. According to the embodiment (C), there can be obtained a U-F resin having a low content of water-soluble ingredients.

DETAILED DESCRIPTION OF THE INVENTION

In the invention, a starting material which can be used for producing the U-F resin is a U-F precondensate or an aqueous solution of U-F mixture, wherein the molar ratio of F/U is in the range of 0.5 to 2.5.

The molar ratio may be adjusted either in one step or in plural steps. It is also possible to use the starting material prepared previously so that the molar ratio will lie in the above defined range. When F is in excess of U, the molar ratio may be adjusted by adding U after addition of a gelling agent.

When the F/U molar ratio is larger than 2.5 (F is in large excess), the yield of the precondensate will be low in the synthesis and when additionally the concentration of the precondensate (nonvolatile matter) in the aqueous solution is relatively high, it is difficult for the urea resin to form particles and in consequence the aqueous solution needs to be diluted with water to a precondensate concentration of 5% by weight or less and the gelation must be carried out at such a low concentration, thus resulting in a low space yield. The term "precondensate" denotes a non-volatile matter which remains as residue without evaporating when the aqueous solution containing the precondensate is heated for 3 hours at a temperature of 105° C. Moreover, since the formaldehyde smell becomes more intense, operation and a facility will be necessary in order to remove remaining formaldehyde.

On the contrary when the F/U molar ratio is less than 0.5 (U is in large excess), the yield is lowered because U is eluted with water.

The pH of the aqueous U-F precondensate solution is in the range of 3.5 to 11, preferably 4 to 10. Departing from the range of 3.5 to 11 is undesirable, since the rate of gelation in such cases may be too high for working or a rubber-like gel may form and fine particles will be difficult to form therefrom.

The U-F condensation reaction temperature is in the range of 0° to 100° C, preferably 40° to 95° C. The reaction period is suitably chosen depending on the reaction temperature, that is, the period may be shortened at a high reaction temperature and prolonged at a low reaction temperature.

In the preparation of the aqueous U-F precondensate solution, the reaction can also be carried out with such a compound as melamine, thiourea, dicyandiamide, benzoguanamine, phenol, or alkylphenol, which can react with F to form a polycondensation product resin.

The F can also be replaced partly by other aldehyde, e.g. acetaldehyde, acrolein, crotonaldehyde, benzaldehyde, glyoxal, and furfurol.

In the present invention, the gelling agent is used for the purpose of gelling the aqueous U-F precondensate solution and forming U-F resin particles from the gel. Further, the gelling agent on reaction with the reactant used can produce particles of silica, alumina, silica-alumina or some other inorganic compound substantially insoluble in water.

Suitable gelling agents for use in the invention are acid substances which are capable of lowering the pH of the aqueous U-F precondensate solution to 4 or less. Such acid substances include; inorganic acid, e.g. hydrochloric acid, nitric acid, sulfuric acid, hydrofluoric acid, phosphoric acid, sulfurous acid, and sulfamic acid; alkali metal hydrogen salts and ammonium hydrogen salts of phosphoric acid and of sulfuric acid; and organic acids, e.g. formic acid, acetic acid, oxalic acid, lactic acid, succinic acid, tartaric acid, citric acid, nicotinic acid, maleic acid, malonic acid, acrylic acid, methacrylic acid, p-toluenesulfonic acid, and oxalacetic acid. At least one of these compounds can be used. These may be used in any of gaseous, liquid, powdery, and aqueous solution states.

The gelling agent is used in an effective amount to decrease the pH of the aqueous U-F precondensate solution to 4 or less and this amount may be suitably chosen depending on the desired mixing ratio of U-F resin particles to inorganic particles.

The pH of the aqueous U-F precondensate solution at the time of gelation is 4 or less, preferably in the range of 3.5 to 1.0. When the pH exceeds 4, the rate of gelation becomes undesirably low and a prolonged time is necessary for the growth of particles. When the pH is excessively low, the gelation proceeds too rapidly for providing a uniform gel.

The gelation temperature is desirably in the range of from ambient to 100° C.,

When treated under the above defined conditions, the aqueous U-F precondensate solution gels in about 10 minutes, giving product A. This product is aged usually at the above-mentioned temperature for a period of 0.5 to 2 hours.

In embodiment A, there are used the above-mentioned acid substance as the gelling agent (hereinafter referred to as gelling agent A) and a reactant (hereinafter referred to as reactant A) which reacts with the acid substance to form inorganic particles substantially insoluble in water.

Reactant A is at least one member selected from the group consisting of alkali silicates and alkali aluminates. More specifically, reactant A is exemplified by silicates, metasilicates, and aluminates of Li, Na, K, and amines. Reactant A is used in the form of powder or aqueous solution.

In embodiment A, particles of an inorganic compound such as silica, alumina, or silica-alumina can be produced by using a reactant A or particles of an inorganic compound such as aluminum silicate, alkaline earth metal silicate, or alkaline earth metal silicofluoride can be produced by using a sub-reactant, which will be described later, jointly with reactant A.

In embodiment B, an acidic silica sol or/and an acidic alumina sol are used as the gelling agent (hereinafter referred to as gelling agent B). This type of acidic sol can be prepared by adding the above-mentioned acid substance, which can decrease the pH of the aqueous U-F precondensate solution to 4 or less, in such an amount to an aqueous solution of alkali silicate or aluminate as to neutralize the alkali in the aqueous solution. It is also possible to use (i) an acidic silica or alumina sol prepared by treating an alkali silicate or aluminate with an ion exchange resin, (ii) a mixture of these sols, or (iii) a mixture of any of (i) and (ii) with the above-mentioned acid substance.

Gelling agent B may be used in the form of aqueous solution, suspension, or slurry, without particular restriction on the form.

In embodiment B, the reactant (hereinafter referred to as reactant B) used is a substance which shows alkalinity in aqueous media and can react with the acidic silica or alumina sol to form inorganic particles substantially insoluble in water.

More specifically, reactant B is at least one of compounds including; alkali silicates or alkali aluminates such as silicates, metasilicates, and aluminates of Li, Na, K, and amines; alkaline silica and alumina sols; cements such as Portland cement, various mixed cements, and doromite; oxides, hydroxides, carbonates, hydrogencarbonates, phosphates, monohydrogenphosphates, and polyphosphates of alkali and alkaline earth metals; and various amines. These reactants B may be used in the form of powder, water containing paste, aqueous suspension or slurry, or aqueous solution.

Reactant A or B is added to product A or mother liquor A. Alternatively, product A or mother liquor A is added to reactant A or B. It is also possible that reactant A or B and either product A or mother liquor A are mixed together in a suitable reactor.

These materials are mixed uniformly and then the reaction is allowed to proceed with stirring or in the standing state or the gelation and grinding are carried out simultaneously in a ball mill to prepare a gel of inorganic compound such as silica, alumina, or silica-alumina.

The reaction with reactant A or B is carried out desirably at a temperature of from ambient to 100° C. usually for a period of 0.5 to 4 hours.

The intended inorganic compound-containing urea resin of the present invention can be obtained by mixing (i) reactant A or B with product A or (ii) urea resin particles separated previously from product A with inorganic particles resulting from mixing reactant A or B with mother liquor A.

In embodiment A, it is unnecessary to limit the amount of reactant A to be used, that is, a suitable amount of reactant A may be chosen depending on the intended mixing ratio of U-F resin particles to inorganic particles.

In embodiment B, reactant B is used in an amount necessary to neutralize the acid contained in product A. That is, reactant B may be added in such an amount that the resulting mixture of product A and reactant B will exhibit a pH of from weak acidity to alkalinity, preferably from weak acidity to weak alkalinity.

In embodiments A and B, the following gelation regulator, sub-reactant, and sub-gelling agent can be added to the reaction system before or after mixing of reactant A or B with product A or simultaneously with the mixing.

The gelation regulator is a compound which can react with an excess alkali to produce an acid. Such compounds include; fatty acid esters of monohydric alcohols, e.g. methyl acetate, ethyl acetate, butyl acetate, and amyl acetate; fatty acid esters of polyhydric alcohols, e.g. ethylene glycol diacetate and glycerol triacetate; inner esters, e.g. ethylene carbonate, $\gamma$-butyrolactone, and $\epsilon$-caprolactone; partial esters of polyhydric alcohols, e.g. ethylene glycol monoformate, ethylene glycol monoacetate, ethylene glycol monopropionate, glycerol monoformate, glycerol monoacetate, glycerol monopropionate, glycerol diformate, glycerol diacetate, sorbitol monoformate, sorbitol monoacetate, and partially-saponified low-molecular poly(vinyl acetate); alcohols, e.g. methanol, ethanol, isopropanol, pentanol, poly(vinyl alcohol), glycerol, and ethylene glycol; aldehydes, e.g. glyoxal, succindialdehyde, malondialdehyde, succinaldehyde, glutaraldehyde, and furfuraldialdehyde; ketones, e.g. acetone; and amides, e.g. formamide, dimethylformamide, acetamide, dimethylacetamide, propionamide, butylamide, acrylamide, malondiamide, pyrrolidone, and caprolactam. These compounds may be used alone or in combination.

Suitable sub-reactants for the production of substantially water-insoluble particles of an inorganic compound other than silica and alumina include oxides, hydroxides, sulfates, phosphates, chlorides, and carbonates of alkaline earth metals, zinc, aluminum, and titanium, and complex salts of these compounds. These compounds may also be used alone or in combination.

In embodiments A and B, the gelling agent and the above-mentioned sub-reactant can be jointly used when urea resin particles are produced by gelation of the aqueous U-F precondensate solution.

Another substances can be used for accelerating the gelatoin as a sub-gelling agent.

Suitable sub-gelling agents include; hydrogencarbonates, chlorides, sulfates, fluorides, silicofluorides, and hydrogenfluorides (bifluorides) of alkali metals such as Li, Na, K, and Cs and of ammonium; and chlorides and sulfates of alkaline earth metals, such as calcium chloride and calcium sulfate, besides gelling agents A and B that are usable for gelling the aqueous U-F precondensate solution to produce urea resin particles, but not used for said purpose. These sub-gelling compounds may also be used alone or in combination.

In embodiment A, the amounts of reactant A and sub-reactant to be added are predetermined depending on the necessary amount of inorganic compounds. When the amount of gelling agent A is insufficient to neutralize the alkali contained in reactant A which is usually added afterward, the sub-gelling agent or the gelation regulator is added in an adequate amount for supplying the shortage.

In embodiment B, the amount of gelling agent B to be added and if necessary, the amount of sub-reactant, sub-gelling agent, or gelation regulator to be added are predetermined depending on the necessary amount of inorganic compounds, and reactant B is added in an adequate amount to neutralize the acidic ingredients contained in these materials.

In embodiment C, sulfuric acid or/and phosphoric acid are used as gelling agents (hereinafter referred to as gelling agent C). A reactant (hereinafter referred to as reactant C) used in this case reacts with gelling agent C: sulfuric acid or/and phosphoric acid remaining in product A obtained by the gelation of the aqueous U-F precondensate solution to neutralize the acid ingredient without forming any water-soluble salt and produce inorganic particles substantially insoluble in water, whereby it is possible to minimize the water-extractable fraction of the resulting U-F resin.

Reactant C is mixed with product A or a liquid-containing urea resin obtained by separating from product A, and is reacted at a temperature of from ambient to 100° C. for a period of 0.5 to 3 hours, whereby the intended inorganic compound-containing urea resin of the present invention can be obtained.

The above mixing is better carried out by using a kneader, solid mixer, or grinder such as a ball mill or a stirrer-equipped ball mill.

Reactants C for use in the present invention can be classified into a first group (hereinafter referred to as reactant C-1) and a second group (hereinafter referred to as reactant C-2).

Reactant C-1 is a material which reacts with sulfuric acid or/and phosphoric acid to produce particles of at least two inorganic compounds substantially insoluble in water. This material is at least one compound selected from the group consisting of silicates of zinc, alkaline earth metals, and aluminum. Individual examples of reactant C-1 are zinc silicate, magnesium silicate, calcium silicates, strontinum silicate, barium silicate, magnesium.calcium silicate, aluminum.calcium silicate, and aluminum silicate. These compounds react with surfuric acid or phosphoric acid to produce silica and water-insoluble sulfates or phosphates.

Reactant C-1 can be prepared by mixing an alkali silicate solution, e.g. an aqueous solution of Li, Na, or K silicate, with; an oxide, hydroxide, carbonate, or hydrogencarbonate of zinc, alkaline earth metal, or of aluminum; doromite; or aluminate of an alkali metal such as Li, Na, or K, and reacting them at a temperature of from ambient to 100° C. for a period of 0.5 to 3 hours.

Alkali from this reaction can be recycled for use as a raw material in the production of alkali silicate so that an effective system may be established.

Reactant C-2 is a material which reacts sulfuric acid or/and phosphoric acid to produce inorganic particles substantially insoluble in water. This material is at least one compound selected from the group consisting of oxides, hydroxides, carbonates, and hydrogen carbonates of zinc, alkaline earth metals, and aluminum.

In embodiment C, reactant C is used in a suitable amount of one or more equivalents to the gelling agent present in or adhering to the U-F resin to treat.

The inorganic compound-containing urea resin obtained can also be subjected to additional treatment which is suitably chosen, depending on the application of the end product, from various combinations of operations, e.g. filtration, separation, washing, granulation, drying, grinding, classification, screening, and high-temperature calcining. Liquids formed by the separation, water used for washing, etc. are reusable.

In the present invention, various additives can be used. These may be added to the aqueous U-F precondensate solution or any of the raw materials of the solution. Alternatively, these additives can be incorporated into mixtures resulting from the addition of any of the gelling agents and reactants.

Water-soluble polymeric materials which can be used for increasing the viscosity of the reaction fluid include; natural polymers, e.g. starch, gelatin, glue, tragacanth gum, agar, and gum arabic; modified natural polymers, e.g. methylcellulose, ethylcellulose, hydroxyethylcellulose, carboxymethylcellulose, and alkali metal salts of these cellulose derivatives, and alkali metal alginates; and synthetic polymers, e.g. poly(vinyl alcohol), poly-vinylpyrrolidone, poly(acrylic acid), poly(methacrylic acid), alkali metal salts of these polymeric acids, polyacrylamide, and polyethylene oxide. These may be used alone or in combination.

The amount of the water-soluble polymeric material to be used, though depending on the kind and molecular weight thereof, is generally in the range of 0.1 to 10%, preferably 0.5 to 5%, by weight based on the nonvolatile matter in the aqueous U-F precondensate solution.

It is also possible to use a chemical for improving the hydrophobic property of the particles. Suitable chemicals for this purpose include; higher alcohols, e.g. lauryl alcohol, myristyl alcohol, cetyl alcohol, and stearyl alcohol; higher fatty acids, e.g. caprylic acid, capric acid, lauric acid, myristic acid and palmitic acid; and ester type surfactants such as esters of higher fatty acid with higher alcohols.

Other surface active materials which can be added include cationic ones such as quaternary ammonium salts, anionic ones such as sulfates and sulfonates of aliphatic alcohols, and nonionic ones such as polyglycol ethers from aliphatic alcohols and those from alkylphenols.

When the production of foams is intended for use as heat insulators and the like, it is possible to add a foaming agent which is in use as a cement concrete builder, e.g. sulfonate of alkylbenzene.

The above-mentioned various additives may also be added after particle formation.

Inorganic particles can be produced from the inorganic compound-containing urea resin of the present invention by burning the resin at a high temperature to vaporize the organic constituents. The thus obtained inorganic particles can be used for a semiconductor, catalyst, catalyst carrier, drying agent, absorbent, ion exchanger, self-flow improver, and purposes similar to those of the inorganic compound-containing urea resin particles, except the slow-release nitrogenous fertilizer.

Effects of the present invention are as follows:

(1) According to the process of the invention, it is possible to produce a urea resin mixed having a good dispersibility and particle sizes of 1 μm or less with inorganic particles which have a wide particle size distribution and are substantially insoluble in water.

(2) A urea resin having a low content of water-soluble matter or a little water-extractable fraction can be produced from a urea resin-containing product (product A) which is obtained by adding a gelling agent to an aqueous U-F precondensate solution, without the operation of removing water-soluble ingredients from product A.

Thus, U-F resin particles can be obtained which, even in wet form, are useful as a filler for paper in paper making processes, slow-release nitrogenous fertilizer, etc.

(3) The particle size distribution can be made wider than that of urea resins alone by blending inorganic particles substantially insoluble in water.

(4) An acid material used in the production of a urea resin can be reused effectively, whereby the load on the effluent disposal system can be reduced.

(5) In a process for producing urea resin particles mixed with inorganic particles, no particular facility is necessary to prepare the inoganic particles, whereby it is possible to simplify tne production steps and shorten the operation time and this contributes to labor saving, energy saving, and productivity improvement.

The present invention is illustrated in more detail with reference to the following examples. In the examples, "parts" and "percentages" are by weight.

EXAMPLES A-1 to A-16

A grinding mill, "ATTRITER" supplied by MitsuiMiike Engineering Corp; (model: 1S, containing 15-mm diameter alumina balls) was used as an agitated ball mill.

(1) Preparation of aqueous U-F precondensate solutions
(i) In the mill were charged 3000 parts of a 37% aqueous formaldehyde solution and 965 parts of urea. The mixture, adjusted with a 20% aqueous sodium hydroxide solution to pH 8.2, was heated up to 90°-95° C. in 1 hour.

Then, 20% sulfuric acid was added to the reaction mixture to adjust the pH thereof to 4.5, and the reaction was continued further at 90° C. for 3 hours.

The resulting mixture was cooled to 20±5° C., and adjusted with a 20% aqueous sodium hydroxide solution to pH 8.0, giving an aqueous U-F precondensate solution (liquid A). (ii) Necessary amounts of urea were added severally to portions of liquid A to adjust the F/U molar ratios to 2.3, 1.8, 1.6, 1.4, 1.0, 0.8, and 0.6, as shown in Table A-1. These mixtures were subjected each to reaction at 65° C. for 3 hours, giving aqueous U-F precondensate solutions (liquids B).

(2) Preparation of inorganic compound-containing urea resins

Gelling agents A shown in Table A-1 were severally added and reacted with liquids B with stirring at 10 r.p.m. at 60° C. for 3 hours, giving urea resin-containing products A.

Then, reactants A shown in Table A-1 were severally added and reacted with products A at 60° C. for 1 hour, giving inorganic compound-containing urea resins.

After cooling to room temperature, each inorganic compound-containing urea resin was measured for particle diameter with an electron microscope. Results of the measurement are shown in Table A-1.

EXAMPLES A-17 to A-32

Aqueous U-F precondensate solutions (liquids B) were prepared according to the procedure of Examples A-1 to A-16. Gelling agents A shown in Table A-2 were severally added and reacted with liquids B at 60° C. for 30 minutes, giving urea resin-containing products A.

The urea resins were separated from products A by means of a centrifuge, and reactants A shown in Table A-2 were severally added and reacted with the obtained mother liquors at 10° C. for 1 hour, forming particles of inorganic compounds.

Each group of inorganic particles was mixed with particles of each separated urea resin (particle sizes were in the range of 0.2 to 0.5 μm). The particle diameter of each inorganic compound-containing urea resin obtained was measured with an electron microscope. Results of the measurement are shown in Table A-2.

Then, 20% sulfuric acid was added to the reaction mixture to adjust the pH thereof to 4.3, and the reaction was continued further at 90° C. for 2 hours.

The resulting mixture was cooled to 20°±5° C., and adjusted with a 20% aqueous sodiumm hydroxide solution to pH 7.8, giving an aqueous U-F precondensate solution (liquid A).

(ii) Necessary amounts of urea were added severally to portions of liquid A to adjust the F/U molar ratios to 2.3, 1.8, 1.6, 1.4, 1.0, 0.8, and 0.6, as shown in Table B-1. These mixtures were subjected each to reaction at 60° C. for 4 hours, giving aqueous U-F precondensate solutions (liquids B).

TABLE A-1

| Example A | Liquid B F/U molar ratio | Gelling agent A | Reactant A | Particle size distribution, (wt %) [Particle diameter: (μm)] | | | | |
|---|---|---|---|---|---|---|---|---|
| | | | | Less than 0.01 | 0.01–0.05 exclusive | 0.05–0.1 exclusive | 0.1–0.5 exclusive | 0.5–1.0 inclusive |
| 1 | 2.3 | (a) | (1) | 7–8 | 5–10 | 5–10 | 35–45 | 35–45 |
| 2 | 1.8 | " | " | " | " | " | " | " |
| 3 | 1.6 | " | " | " | " | " | " | " |
| 4 | 1.4 | " | " | " | " | " | " | " |
| 5 | 1.0 | " | " | " | " | 25–30 | 25–35 | 25–35 |
| 6 | 0.8 | " | " | " | " | " | " | " |
| 7 | 0.6 | " | " | " | " | " | " | " |
| 8 | 2.3 | (b) | (2) | 6–8 | 6–10 | 5–10 | 30–40 | 40–50 |
| 9 | 1.8 | " | " | " | " | " | " | " |
| 10 | 1.6 | " | " | " | " | " | " | " |
| 11 | 1.4 | " | " | " | " | " | " | " |
| 12 | 1.0 | " | " | " | " | 30–35 | 25–35 | 20–30 |
| 13 | 0.8 | " | " | " | " | " | " | " |
| 14 | 0.6 | " | " | " | " | " | " | " |
| 15 | 1.0 | (c) | (3) | 7–10 | 5–8 | 5–10 | 30–40 | 40–50 |
| 16 | 1.4 | (d) | (4) | 5–10 | 5–10 | 5–10 | 35–45 | 35–45 |

TABLE A-2

| Example A | Liquid B F/U molar ratio | Gelling agent A | Reactant A | Particle size distribution, (wt %) [Particle diameter: (μm)] | | | | |
|---|---|---|---|---|---|---|---|---|
| | | | | Less than 0.01 | 0.01–0.05 exclusive | 0.05–0.1 exclusive | 0.1–0.5 exclusive | 0.5–1.0 inclusive |
| 17 | 2.3 | (a) | (1) | 0 | 17–19 | 1–3 | 70–78 | 4–8 |
| 18 | 1.8 | " | " | " | " | " | " | " |
| 19 | 1.6 | " | " | " | " | " | " | " |
| 20 | 1.4 | " | " | " | " | " | " | " |
| 21 | 1.0 | " | " | " | " | " | " | " |
| 22 | 0.8 | " | " | " | " | " | " | " |
| 23 | 0.6 | " | " | " | " | " | " | " |
| 24 | 2.3 | (b) | (2) | 0 | 16–18 | 2–4 | 70–78 | 4–8 |
| 25 | 1.8 | " | " | " | " | " | " | " |
| 26 | 1.6 | " | " | " | " | " | " | " |
| 27 | 1.4 | " | " | " | " | " | " | " |
| 28 | 1.0 | " | " | " | " | " | " | " |
| 29 | 0.8 | " | " | " | " | " | " | " |
| 30 | 0.6 | " | " | " | " | " | " | " |
| 31 | 1.0 | (c) | (3) | 0 | 16–18 | 2–4 | 70–78 | 4–8 |
| 32 | 1.4 | (d) | (4) | 0 | 16–18 | 2–4 | 70–78 | 4–8 |

Notes (common to Tables A-1 and A-2):
(a) 5600 parts of 10% aq. $H_3PO_4$.
(b) 7200 parts of 10% aq. $H_2SO_4$ + 300 parts of Al—sulfate.
(c) 5600 parts of aqueous solution containing 27.5% of K—hydrogensulfate + 0.3% of Mg—oxide.
(d) 5600 parts of 12.5% aq. acetic acid.
(1) 8160 parts of 37% aqueous solution of JIS K-1408 No. 3 sodium silicate (water glass).
(2) 8170 parts of 3.65% ($Al_2O_3$) aqueous solution of sodium aluminate ($Na_2O/Al_2O_3$ molar ratio: 2.5).
(3) 8120 parts of 37% aqueous solution of JIS K-1408 No. 3 sodium silicate.
(4) 10000 parts of 5.5% ($K_2O$) aqueous solution of potassium silicate ($SiO_2/K_2O$ molar ratio: 3.5).

EXAMPLES B-1 to B-14

(1) Preparation of aqueous U-F precondensate solutions (i) In a mill (used in Exampels A-1 to A-16) were charged 2000 parts of 37% aqueous formaldehyde solution and 644.3 parts of urea. The mixture, adjusted with a 20% aqueous sodium hydroxide solution to pH 8.0, was heated up to 90–95° C. in 1 hour.

2) Preparation of gelling agents B;.

(i) Preparation of acidic silica sol solution

An acidic silica sol solution (designated as (e)) was prepared by adding a solution of JIS K-1408 No. 3 water glass (1000 parts) in 1725 parts of water to 3735 parts of 10% sulfuric acid.

(ii) Preparation of acidic alumina sol solution

An acidic alumina sol solution (designated as (f)) was prepared by adding 100 parts of potassium alum to 4800 parts of 10% sulfuric acid and then adding a solution of aqueous sodium aluminate (1000 parts, containing 19.5% of $Na_2O$ and 12.1% of $Al_2O_3$) in 1725 parts of water to the mixture.

(3) Preparation of inorganic compound-containing urea resins

Gelling agents B prepared in (2) above were severally added and reacted with liquids B from (1) above with stirring at 10 r.p.m. at 30° C. for 2 hours, giving urea resin containing product A. Then, reactant B shown in Table B-1 were severally added to product A. Thus, these were reacted and aged at 20° C. for 2 hours, giving inorganic compound-containing urea resins.

After cooling to room temperature, each inorganic compound-containing urea resin was measured for particle diameter with an electron microscope. Results of the measurement are shown in Table B-1.

Preparation of reactants C-1

An aqueous sodium silicate solution was prepared by adding 3000 parts of water to 1000 parts of JIS K-1408 No. 3 water glass.

To portions of this sodium silicate solution were severally added and reacted 1008 parts of zinc hydroxide, 560 parts of magnesium hydroxide, 780 parts of calcium hydroxide, 1739 parts of barium hydroxide, and 830 parts of sodium aluminate at 20° C. for 2 hours.

Each formed precipitate was separated from the mother liquor by means of a centrifuge. The solid obtained was dispersed in a twice amount of pure water, and the solid was separated again by means of a centrifuge.

This operation was repeated 3–5 times to remove the alkali, giving each of zinc silicate, magnesium silicate, calcium silicate, barium silicate, and aluminum silicate.

Reagents of chemical pure (made by Wako Pure Chemical Industry Ltd.) were used as magnesium-calcium silicate and aluminum-calcium silicate.

TABLE B-1

| Example B | Liquid B F/U molar ratio | Gelling agent B | Reactant B | Particle size distribution, (wt %) [Particle diameter: (μm)] | | | | |
|---|---|---|---|---|---|---|---|---|
| | | | | Less than 0.01 | 0.01–0.05 exclusive | 0.05–0.1 exclusive | 0.1–0.5 exclusive | 0.5–1.0 inclusive |
| 1 | 2.3 | (e) | (5) | 5–10 | 5–10 | 5–10 | 25–35 | 45–55 |
| 2 | 1.8 | | | " | " | " | " | " |
| 3 | 1.6 | | | " | " | " | " | " |
| 4 | 1.4 | | | " | " | " | " | " |
| 5 | 1.0 | | | " | " | " | 45–55 | 15–25 |
| 6 | 0.8 | | | " | " | " | " | " |
| 7 | 0.6 | | | " | " | " | " | " |
| 8 | 2.3 | (f) | (6) | 5–10 | 10–15 | 10–15 | 25–35 | 35–45 |
| 9 | 1.8 | | | " | " | " | " | " |
| 10 | 1.6 | | | " | " | " | " | " |
| 11 | 1.4 | | | " | " | " | " | " |
| 12 | 1.0 | | | " | " | " | 50–60 | 10–20 |
| 13 | 0.8 | | | " | " | " | " | " |
| 14 | 0.6 | | | " | " | " | " | " |

Notes:
(e) Acidic silica sol solution.
(f) Acidic alumina sol solution.
(5) Solution of 1000 parts of JIS K-1408 No. 3 water glass in 1000 parts of water.
(6) Mixture of 1000 parts of aqueous sodium aluminate solution (containing 19.5% of $Na_2O$ and 12.1% of $Al_2O_3$) and 1000 parts of water.

EXAMPLES C-1 to C-7 and COMPARATIVE EXAMPLES C-1 to C-7

(1) Preparation of aqueous U-F precondensate solutions (i) A mixture of 1950 parts of a 35% aqueous formaldehyde solution and 513 parts of urea was adjusted with a 20% aqueous sodium hydroxide solution to pH 7.9 and then heated up to 90°–95° C. in 1 hour.

Then, 20% sulfuric acid was added to this reaction mixture to adjust the pH thereof to 4.3, and the reaction was continued further at 92° C. for 2.5 hours.

The resulting mixture was cooled to 20°±5° C., and adjusted with a 20% aqueous sodium hydroxide solution to pH 7.8, giving an aqueous U-F precondensate solution (liquid A).

(ii) Necessary amounts of urea were added severally to portions of liquid A to adjust the F/U molar ratios 2.3, 1.9, 1.7, 1.5, 1.0, 0.8, and 0.6, as shown in Table C-1. These mixtures were subjected each to reaction at 75° C. for 3 hours, giving aqueous U-F precondensate solutions (liquids B).

(3) Preparation of inorganic compound-containing urea resin particles

3000 Parts of water was added to 1000 parts each of the aqueous U-F precondensate solutions (liquids B) prepared in (1) above. The diluted solution was charged in a kneader kept at 70° C., and 1500 parts each of gelling agents shown in Table C-1 was added to the charged solution at 65° C. and reacted at 70° C. for 2 hours to gel the mixture giving urea resin-containing product A.

Reactants C-1 shown in Table C-1 were added severally to products A obtained in slurry form and reacted at 70° C. for 1 hour. Then solids were separated from the mother liquors by means of a centrifuge, giving particles of inorganic compound-containing urea resins.

The water-extractable fraction of each group of the inorganic compound-containing urea resin particles is shown in Table C-1. For comparison, Table C-1 shows also the water-extractable fraction of urea resin particles prepared without using the reactant of the present invention.

In all the examples, the water-extractable fraction of resin particles was measured in the following way:

Sample resin particles are air-dried at 40° C. for 24 hours, and 100 parts (weight: $W_o$) of the dried sample is placed in 1000 parts of pure water. After 30 minutes, stirring at room temperature, the mixture is filtered to remove the solid. The filtrate is evaporated to dryness, and the residue is dried at 105°–110° C. for 3 hours and weighed. This weight ($W_1$) is assumed as the amount of fraction extracted and the water-extractable fraction is calculated according to the following equation:

mother liquors by means of a centrifuge. Liquid contents of the solids were from 42 to 38% (solid contents 58–62%).

1000 Parts each of these wet solids was charged in a kneader, and each of reactants C-1 shown in Table C-2 was added and reacted at 70° C. for 1 hour, giving inorganic compound-containing urea resin particles.

Table C-2 shows the water-extractable fraction of each group of the inorganic compound-containing urea resin particles thus obtained. For comparison, Table C-2 shows also the water-extractable fraction of urea resin particles prepared without using the reactant of the present invention.

TABLE C-1

| | Liquid B F/U molar ratio | Gelling*1 agent | Reactant*2 C-1 | parts | Extractable fraction (%) |
|---|---|---|---|---|---|
| Example C-1 | 2.3 | (b) | Mg—silicate | 193 | 4.4 |
| Comparative Example C-1 | " | " | — | | 30.5 |
| Example C-2 | 1.9 | (b) | Zn—silicate | 280 | 3.2 |
| Comparative Example C-2 | " | " | — | | 27.5 |
| Example C-3 | 1.7 | (b) | Al—silicate | 151 | 2.5 |
| Comparative Example C-3 | " | " | — | | 25.8 |
| Example C-4 | 1.5 | (a) | Ca—silicate | 158 | 1.8 |
| Comparative Example C-4 | " | " | — | | 24.5 |
| Example C-5 | 1.0 | (a) | Ba—silicate | 328 | 1.4 |
| Comparative Example C-5 | " | " | — | | 24.5 |
| Example C-6 | 0.8 | (b) | Al.Ca—silicate | 148 | 3.0 |
| Comparative Example C-6 | " | " | — | | 25.5 |
| Example C-7 | 0.6 | (b) | Mg.Ca—silicate | 190 | 11.2 |
| Comparative Example C-7 | " | " | — | | 30.0 |

Notes (common to Tables C-1, C-2, C-3, and C-4):
*1: (a) 10% aqueous $H_2SO_4$
(b) 10% aqueous $H_3PO_4$
*2: Parts are based on dry weight.

TABLE C-2

| | Liquid B F/U molar ratio | Gelling*1 agent | Reactant*2 C-1 | parts | Extractable fraction (%) |
|---|---|---|---|---|---|
| Example C-8 | 2.3 | (b) | Mg—silicate | 55.0 | 4.5 |
| Comparative Example C-8 | " | " | — | | 24.3 |
| Example C-9 | 1.9 | (b) | Zn—silicate | 80.5 | 3.3 |
| Comparative Example C-9 | " | " | — | | 23.6 |
| Example C-10 | 1.7 | (b) | Al—silicate | 43.2 | 2.6 |
| Comparative Example C-10 | " | " | — | | 22.8 |
| Example C-11 | 1.5 | (a) | Ca—silicate | 45.0 | 1.9 |
| Comparative Example C-11 | " | " | — | | 21.4 |
| Example C-12 | 1.0 | (a) | Ba—silicate | 94.0 | 1.5 |
| Comparative Example C-12 | " | " | — | | 21.5 |
| Example 13 | 0.8 | (b) | Al.Ca—silicate | 88.0 | 3.1 |
| Comparative Example C-13 | " | " | — | | 23.2 |
| Example C-14 | 0.6 | (b) | Mg.Ca—silicate | 124.0 | 11.5 |
| Comparative Example C-14 | " | " | — | | 33.1 |

$$\text{Extractable fraction (\%)} = \frac{W_1}{W_o} \times 100$$

EXAMPLES C-8 to C-14

Products A prepared according to the procedure of Examples C-1 to C-7 were separated into solids and As shown in Tables C-1 and C-2, particles of inorganic compound-containing urea resins of the present invention in all the cases exhibit smaller water-extractable fractions than those of resins prepared in Comparative Examples C-1 to C-14.

It may be noted that urea resin particles prepared according to the procedure of Comparative Examples C-1 to C-14 but neutralizing the acid in product A with each of sodium hydroxide or ammonia (reactants) showed larger water-extractable fractions than those of resin particles prepared in Comparative Examples C-1 to C-14.

Addition of the reactant of the present invention after neutralization of the acid contained in product A with sodium hydroxide or ammonia gives urea resin particles having a large water-extractable fraction. No improvement in this respect is brought about by this method.

EXAMPLES C-15 to C-21, COMPARATIVE EXAMPLES C-15 to C-21, and REFERENCE EXAMPLES C-1 to C-3

(1) Preparation of aqueous U-F precondensate solutions (i) A mixture of 1500 parts of a 37% aqueous formaldehyde solution and 482.5 parts of urea was adjusted with a 20% aqueous sodium hydroxide solution to pH 8.1 and then heated up to 90°–95° C. in 1 hour.

Then, 20% sulfuric acid was added to this reaction mixture to adjust the pH thereof to 4.6, and the reaction was continued further at 95° C. for 2 hours.

The resulting mixture was cooled to 20±5° C., and adjusted with a 20% aqueous sodium hydroxide solution to pH 8.1 giving an aqueous U-F precondensate solution (liquid A).

(ii) Necessary amounts of urea were added severally to portions of liquid A to adjust the F/U molar ratios to 2.3, 1.8, 1.6, 1.4, 1.0, 0.8, and 0.6, as shown in Table C-3. These mixtures were subjected to reaction at 80° C. for 2 hours, giving aqueous U-F precondensate solutions (liquids B).

(2) Preparation of inorganic compound-containing urea resin particles

1500 Parts of water was added to 1000 parts each of liquids B prepared in (1) above. The diluted solution was charged in a kneader, and 1500 parts each of gelling agents shown in Table C-3 was added and reacted at 80° C. for 2 hours to gel the mixture giving urea resin-containing product A.

Products A thus obtained were separated into solids and mother liquors by means of a centrifuge. Liquid contents of the solids were from 42 to 38% (solid contents 58–62%).

1000 Parts each of these wet solids was charged in an agitated ball mill, and each of reactants C-2 shown in Table C-3 (reagent of chemical pure, made by Wako Pure Chemical Industry Ltd.) was added and reacted at 60° C. for 1 hour, giving inorganic compound-containing urea resin particles.

The agitated ball mill used is "ATTRITOR" (model 1S, containing 15-mm diameter alumina balls, supplied by Mitsui Miike Engineering Corp.).

Table C-3 shows the water-extractable fraction of each group of the inorganic compound-containing urea resin particles thus obtained. For comparison, Table C-3 shows also the water-extractable fraction of urea resin particles prepared without using the reactant of the present invention and for reference, that of urea resin particles prepared by using common alkali reactants.

Particle diameters of the inorganic compound-containing urea resins obtained were measured with an electron microscope. The found particle diameters in examples of the present invention were in the range of 0.1 to 5 μm while those in comparative examples were all in a narrow range of 0.1 to 0.3 μm.

EXAMPLES C-22 to C-28, COMPARATIVE EXAMPLES C-22 to C-28, and REFERENCE EXAMPLES C-4 to C-6

1500 Parts each of liquids B prepared according to the procedure of Example C-19 was charged in an agitated ball mill, and 1500 parts each of gelling agents shown in Table C-4 was added and reacted at 75° C. for 2 hours to gel the mixture giving urea resin-containing product A.

Reactants C-2 (reagents of chemical pure, made by Wako Pure Chemical Industry Ltd.) were added severally to products A thus obtained. The reaction was carried out at 80° C. for 1 hour, giving inorganic compound-containing urea resin particles.

Table C-4 shows the water-extractable fraction of each group of the inorganic compound-containing urea resin particles thus obtained. For comparison, Table C-4 shows also the water-extractable fraction of urea resin particles prepared without using the reactant of the present invention and for reference, that of urea resin particles prepared by using common alkali reactants.

Particle diameters of the inorganic compound-containing urea resins obtained were measured with an electron microscope. Results of the measurement are also shown in Table C-4.

According to the process of the present invention, it is possible to provide urea resin particles having a little water-extractable fraction and a wide particle size distribution.

Good results were obtained when inorganic compound-containing urea resin particles obtained in the examples of the invention were used as filler particles for paper in a paper making process.

TABLE C-3

| | Liquid B F/U molar ratio | Gelling*1 agent | Reactant*2 | parts | Extractable fraction (%) |
|---|---|---|---|---|---|
| Example C-15 | 2.3 | (b) | Al—hydroxide | 44.5 | 4.3 |
| Comparative Example C-15 | " | " | — | | 24.0 |
| Example C-16 | 1.8 | (b) | Mg—oxide | 52.5 | 3.2 |
| Comparative Example C-16 | " | " | — | | 23.0 |
| Example C-17 | 1.6 | (b) | Zn—hydroxide | 72.5 | 2.6 |
| Comparative Example C-17 | " | " | — | | 22.6 |
| Example C-18 | 1.4 | (a) | Ca—carbonate | 45.5 | 1.6 |
| Comparative Example C-18 | " | " | — | | 21.4 |
| Example C-19 | 1.0 | (a) | Ca—oxide | 25.2 | 1.3 |
| Comparative | " | " | — | | 21.3 |

TABLE C-3-continued

| | Liquid B F/U molar ratio | Gelling*1 agent | Reactant*2 C-2 | parts | Extractable fraction (%) |
|---|---|---|---|---|---|
| Example C-19 | | | | | |
| Example C-20 | 0.8 | (a) | Ba—carbonate | 77.5 | 3.1 |
| Comparative Example C-20 | " | " | — | | 23.0 |
| Example C-21 | 0.6 | (a) | Ba—carbonate | 89.5 | 12.0 |
| Comparative Example C-21 | " | " | — | | 32.0 |
| Reference Example C-1 | 2.3 | (b) | NaOH | 61.5 | 32.0 |
| Reference Example C-2 | 1.0 | (a) | KOH | 55.0 | 33.3 |
| Reference Example C-3 | 0.6 | (a) | NH$_3$ | 17.5 | 37.0 |

TABLE C-4

| | Gelling*1 agent | Reactant*2 C-2 | parts | Extractable fraction, % | Particle diameter μm |
|---|---|---|---|---|---|
| Example C-22 | (b) | Al—oxide | 78.5 | 2.5 | 0.2–1.5 |
| Comparative Example C-22 | " | — | | 15.6 | 0.2–0.4 |
| Example C-23 | (b) | Mg—hydroxide | 135 | 2.6 | 0.2–1.5 |
| Comparative Example C-23 | " | — | | 16.0 | 0.2–0.4 |
| Example C-24 | (b) | Zn—oxide | 190 | 2.5 | 0.2–1.0 |
| Comparative Example C-24 | " | — | | 15.4 | 0.2–0.4 |
| Example C-25 | (b) | Ca—hydroxide | 170 | 3.5 | 0.2–10 |
| Comparative Example C-25 | " | — | | 15.8 | 0.2–0.4 |
| Example C-26 | (b) | Ba—oxide | 355 | 2.3 | 0.2–1.5 |
| Comparative Example C-26 | " | — | | 16.6 | 0.2–0.4 |
| Example C-27 | (a) | Ca—carbonate | 153 | 3.6 | 0.2–10 |
| Comparative Example C-27 | " | — | | 16.2 | 0.2–0.4 |
| Example C-28 | (a) | Ca—oxide | 86 | 3.7 | 0.2–15 |
| Comparative Example C-28 | " | — | | 16.4 | 0.2–0.4 |
| Reference Example C-4 | (b) | NaOH | 186 | 19.5 | 0.2–0.4 |
| Reference Example C-5 | (b) | KOH | 258 | 27.6 | 0.2–0.4 |
| Reference Example C-6 | (a) | NH$_3$ | 53 | 17.5 | 0.2–0.4 |

What is claimed is:

1. A process for producing an inorganic compound-containing urea resin, which comprises adding an acidic gelling agent to an aqueous urea-formaldehyde precondensate solution in an effetive amount with an acidic gelling agent capable of decreasing the pH of the aqueous urea-formaldehyde precondensate solution to 4 or less to prepare a urea resin-containing product, and mixing the product with a reactant which reacts with the acidic gelling agent to form inorganic particles substantially insoluble in water.

2. The process of claim 1, wherein the acidic gelling agent is at least one compound selected from inorganic acids, alkali metal hydrogen salts of inorganic acids, ammonium hydrogen salts of inorganic acids, and organic acids, and the reactant is at least one compound selected from the group consisting of alkali silicates and alkali aluminates.

3. The process of claim 1, wherein the acidic gelling agent is selected from an acidic silica sol and an acidic alumina sol, and the reactant is an alkaline substance.

4. The process of claim 1, wherein the acidic gelling agent is selected from sulfuric acid and phosphoric acid, and the reactant is at least one compound selected from the group consisting of zinc silicate, alkaline earth metal silicates, and aluminum silicate.

5. The process of claim 1, wherein the acidic gelling agent is selected from sulfuric acid and phosphoric acid, and the reactant is at least one compound selected from the group consisting of the respective oxides, hydroxides, carbonates, and hydrogencarbonates of zinc, alkaline earth metals, and aluminum.

6. A process for producing an inorganic compound-containing urea resin, which comprises adding an acidic gelling agent to an aqueous urea-formaldehyde precondensate solution in an effective amount with an acidic gelling agent capable of decreasing the pH of the aqueous urea-formaldehyde precondensate solution to 4 or less to prepare a urea resin-containing product, separating the urea resin from the product, mixing the resin-freed mother liquor with a reactant which reacts with the acidic gelling agent to form inorganic particles substantially insoluble in water, and mixing the resulting inorganic particles with the separated urea resin.

7. The process of claim 6, wherein the acidic gelling agent is at least one compound selected from inorganic acids, alkali metal hydrogen salts of inorganic acids, aummonium hydrogen salts of inorganic acids, and organic acids, and the reactant is at least one compound selected from the group consisting of alkali silicates and alkali aluminates.

8. The process of claim 6, wherein the acidic gelling agent is selected from an acidic silica sol and an acidic alumina sol, and the reactant is an alkaline substance.

* * * * *